United States Patent
Chen

(10) Patent No.: US 8,684,604 B2
(45) Date of Patent: Apr. 1, 2014

(54) SLIDE RAIL DEVICE

(76) Inventor: Feng-Tien Chen, Taichung (TW)

( * ) Notice: Subject to any disclaimer, the term of this patent is extended or adjusted under 35 U.S.C. 154(b) by 0 days.

(21) Appl. No.: 13/572,074

(22) Filed: Aug. 10, 2012

(65) Prior Publication Data

US 2013/0071052 A1    Mar. 21, 2013

(30) Foreign Application Priority Data

Sep. 15, 2011   (TW) .............................. 100217298 U

(51) Int. Cl.
*F16C 29/06* (2006.01)
*F16C 19/00* (2006.01)

(52) U.S. Cl.
USPC .................................. 384/44; 384/50; 384/55

(58) Field of Classification Search
USPC ........... 384/43–46, 50, 55, 56, 530, 560, 561, 384/564, 565, 568, 569, 622
See application file for complete search history.

(56) References Cited

U.S. PATENT DOCUMENTS

| | | | | |
|---|---|---|---|---|
| 997,829 A | * | 7/1911 | Keiper | 384/561 |
| 1,510,920 A | * | 10/1924 | Bronander | 384/565 |
| 4,352,526 A | * | 10/1982 | Imai | 384/44 |
| 5,211,483 A | * | 5/1993 | Blaurock | 384/56 |
| 6,478,470 B1 | * | 11/2002 | Bode | 384/473 |

FOREIGN PATENT DOCUMENTS

| DE | 4223499 A1 | * | 1/1994 |
|---|---|---|---|
| GB | 2084666 A | * | 4/1982 |

OTHER PUBLICATIONS

Machine translation of DE 4223499 A1 obtained on Aug. 15, 2013.*

* cited by examiner

*Primary Examiner* — Marcus Charles
*Assistant Examiner* — Adam D Rogers
(74) *Attorney, Agent, or Firm* — The Mueller Law Office, P.C.

(57) ABSTRACT

A slide rail device includes a guide rail, a slider slidable along the guide rail, and a pair of cylindrical roller train sets disposed at two opposite sides of the guide rail. Each cylindrical roller train set is disposed between the guide rail and the slider, and has a plurality of cylindrical rollers. Each cylindrical roller has a first roller surface portion and a second roller surface portion that is recessed relative to the first roller surface portion. The first roller surface portions of the cylindrical rollers are in rolling contact with the guide rail and the slider, and the second roller surface portions of the cylindrical rollers are free of contact with the guide rail and the slider.

7 Claims, 8 Drawing Sheets

SLIDE RAIL DEVICE

CROSS-REFERENCE TO RELATED APPLICATION

This application claims priority to Taiwanese Application No. 100217298, filed on Sep. 15, 2011.

BACKGROUND OF THE INVENTION

1. Field of the Invention

The invention relates to a slide rail device, and more particularly to a slide rail device having a relatively long service life.

2. Description of the Related Art

In FIG. 4 of U.S. Pat. No. 6,109,789, there is disclosed a conventional slide rail device that includes a guide rail, a slider slidable along the guide rail, and a plurality of cylindrical roller train sets disposed between the guide rail and the slider.

However, the conventional slide rail device may be worn out at rolling contact portions due to long-time usage or strong impact, which may reduce precision of the machine. When the guide rail is damaged, the whole slide rail device must be disassembled for replacement, and the precision of the machine must be re-calibrated. The entire machine may even need to be discarded, thereby resulting in a huge cost.

SUMMARY OF THE INVENTION

Therefore, an object of the present invention is to provide a slide rail device that may prolong the service life thereof.

According to the present invention, a slide rail device comprises:

a guide rail having two opposite lateral surfaces;

a slider slidable along the guide rail, the slider including opposite lateral parts, each of which confronts a respective one of the lateral surfaces of the guide rail; and a pair of cylindrical roller train sets, each of which is disposed between a respective one of the lateral surfaces of the guide rail and a respective one of the lateral parts of the slider.

Each of the lateral surfaces of the guide rail is formed with a first roller-confronting wall surface, and each of the lateral parts of the slider is formed with a second roller-confronting wall surface that confronts the first roller-confronting wall surface on the respective one of the lateral surfaces of the guide rail.

Each confronting pair of the first and second roller-confronting wall surfaces defines a first through-hole, and each of the lateral parts of the slider is further formed with a second through-hole.

Each of the cylindrical roller train sets extends through a respective one of the first through-holes and a respective one of the second through-holes.

The first roller-confronting wall surface of each of the lateral surfaces has a first surface portion with opposite outer and inner edge parts respectively proximate to and distal from the confronting one of the lateral parts of the slider, and a second surface portion extending from one of the outer and inner edge parts of the first surface portion.

The second roller-confronting wall surface of each of the lateral parts has third and fourth surface portions respectively confronting the first and second surface portions of the first roller-confronting wall surface on the respective one of the lateral surfaces of the guide rail.

Each of the cylindrical roller train sets includes a plurality of cylindrical rollers, each having a first roller surface portion and a second roller surface portion that is recessed relative to the first roller surface portion.

For each of the cylindrical roller train sets, the first roller surface portions of the cylindrical rollers are in rolling contact with a respective confronting pair of the first and second roller-confronting wall surfaces at one of confronting pairs of the first and third surface portions and the second and fourth surface portions, and the second roller surface portions of the cylindrical rollers are free of contact with the respective confronting pair of the first and second roller-confronting wall surfaces.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
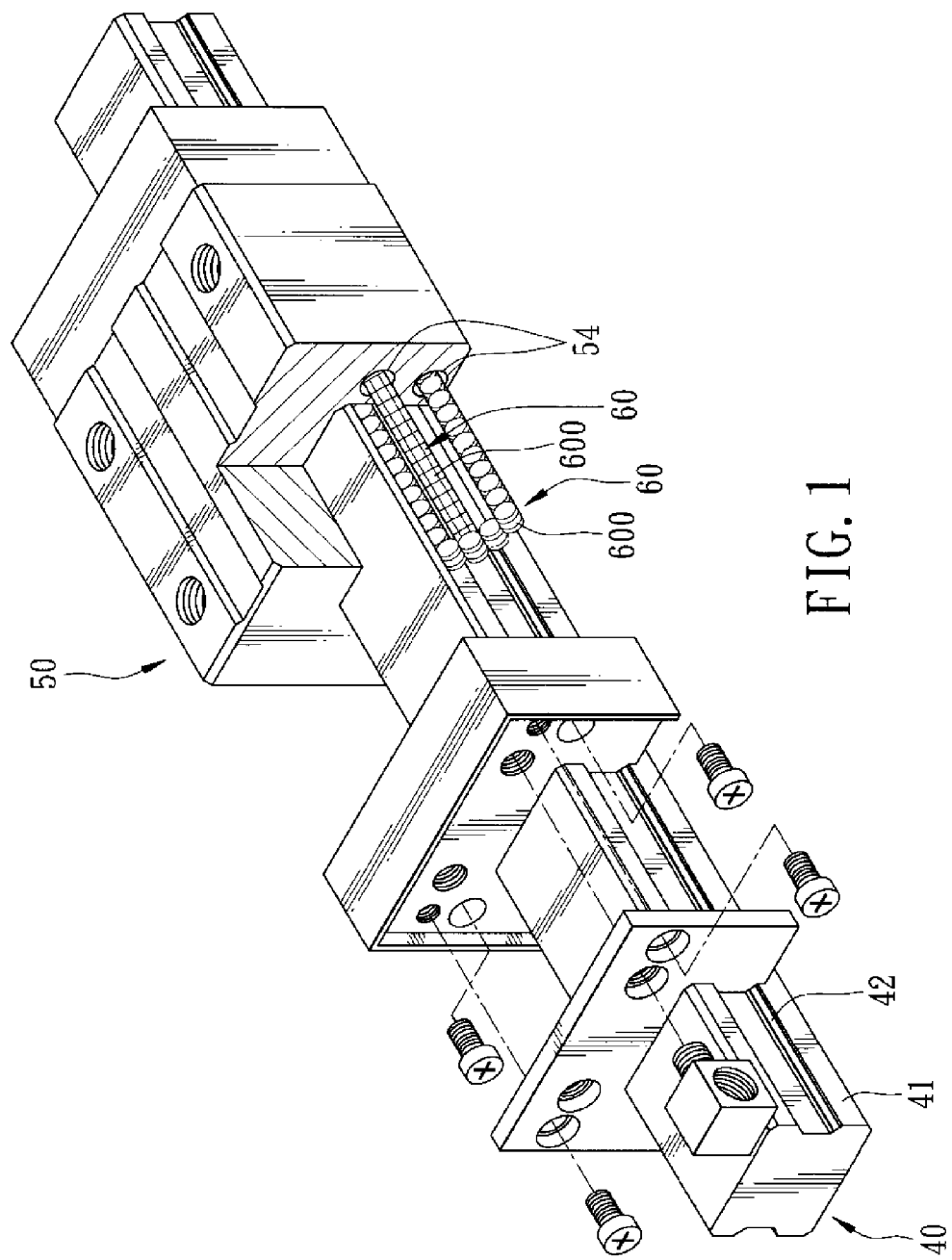
FIG. 1 is a perspective view showing a preferred embodiment of the slide rail device according to the present invention.
Figure 2:
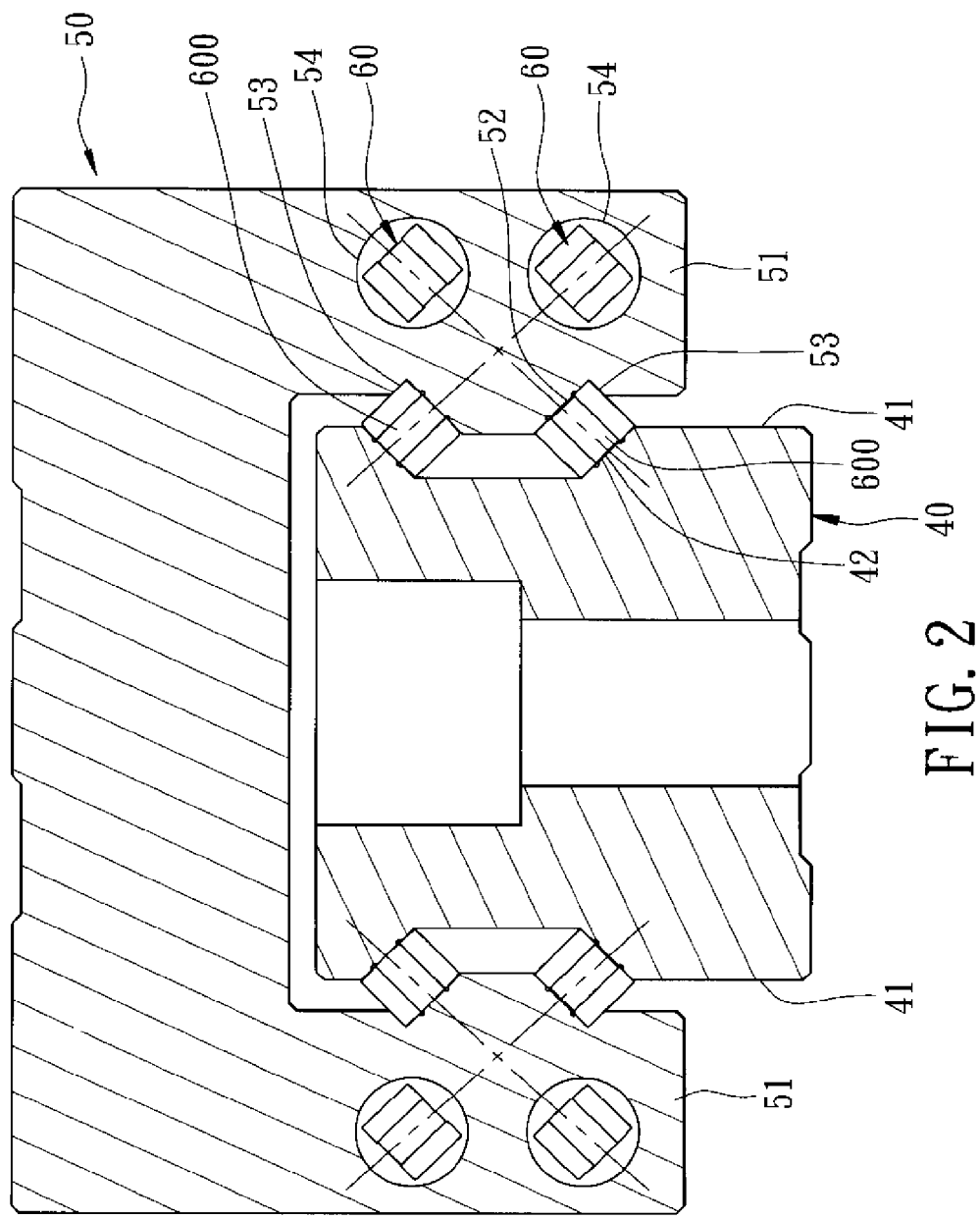
FIG. 2 is a sectional view of the preferred embodiment.

Referring to FIG. 1 and FIG. 2, the preferred embodiment of the slide rail device according to this invention is shown to include a guide rail 40 having two opposite lateral surfaces 41, a slider 50, and two pairs of cylindrical roller train sets 60. In other embodiments, the slide rail device may include only one pair or more than two pairs of the cylindrical roller train sets 60.

The slider 50 is slidable along the guide rail 40, and includes opposite lateral parts 51. Each of the lateral parts 51 confronts a respective one of the lateral surfaces 41 of the guide rail 40.

For each pair of the cylindrical roller train sets 60, each of the cylindrical roller train sets 60 is disposed between a respective one of the lateral surfaces 41 of the guide rail 40 and a respective one of the lateral parts 51 of the slider 50.

For each pair of the cylindrical roller train sets 60, each of the lateral surfaces 41 of the guide rail 40 is formed with an inclined first roller-confronting wall surface 42, and each of the lateral parts 51 of the slider 50 is formed with an inclined second roller-confronting wall surface 52 that confronts the first roller-confronting wall surface 42 on the respective one of the lateral surfaces 41 of the guide rail 40.

Each confronting pair of the first and second roller-confronting wall surfaces 42, 52 defines a first through-hole 53, and each of the lateral parts 51 of the slider 50 is further formed with a second through-hole 54 to correspond with the first through-hole 53. Each of the cylindrical roller train sets 60 extends through a respective one of the first through-holes 53 and a respective one of the second through-holes 54.

Figure 3:
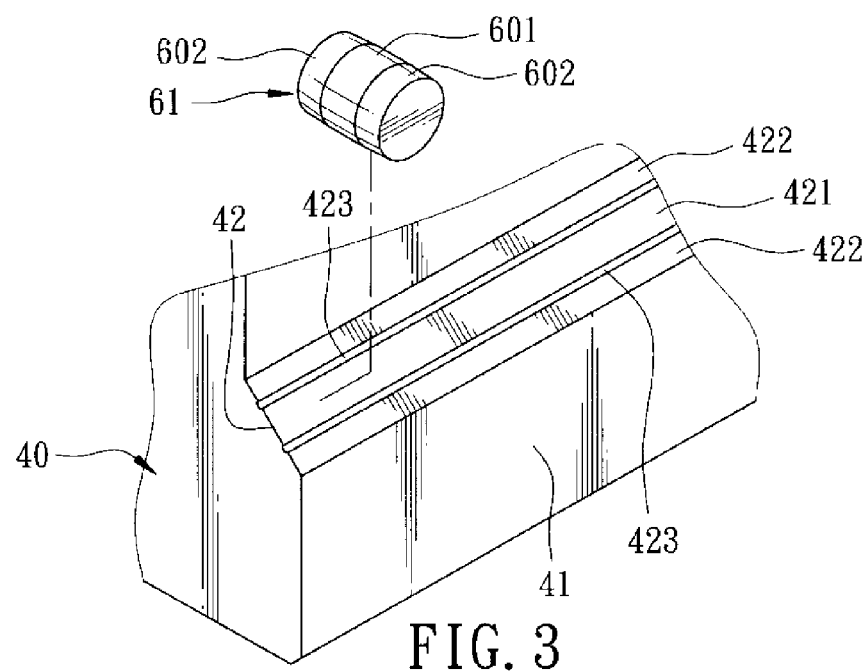
FIG. 3 is a fragmentary perspective view of the preferred embodiment showing a cylindrical roller having a first roller configuration and cooperating with a guide rail.
Figure 4:
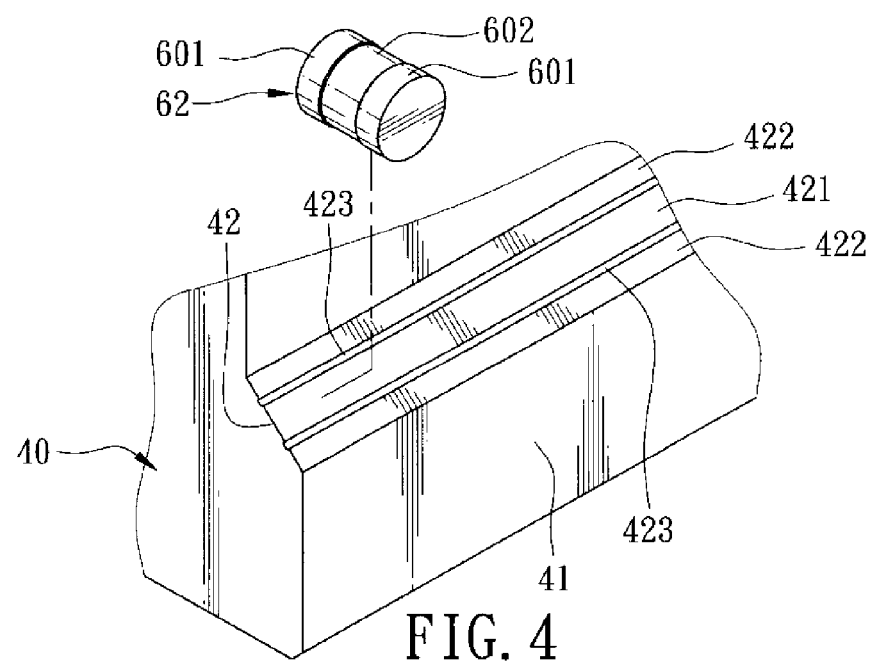
FIG. 4 is a fragmentary perspective view of the preferred embodiment showing a cylindrical roller having a second roller configuration and cooperating with the guide rail.

Referring to FIGS. 2, 3, and 4, the first roller-confronting wall surface 42 of each of the lateral surfaces 41 has a first surface portion 421 with opposite outer and inner edge parts respectively proximate to and distal from the confronting one of the lateral parts 51 of the slider 50, and at least one second surface portion 422 extending from one of the outer and inner edge parts of the first surface portion 421. In this embodiment, each first roller-confronting wall surface 42 has two second surface portions 422 respectively extending from the outer and inner edge parts of the first surface portion 421, and further has two first trenches 423. Each first trench 423 extends between the first surface portion 421 and a respective one of the second surface portions 422.

Figure 5:
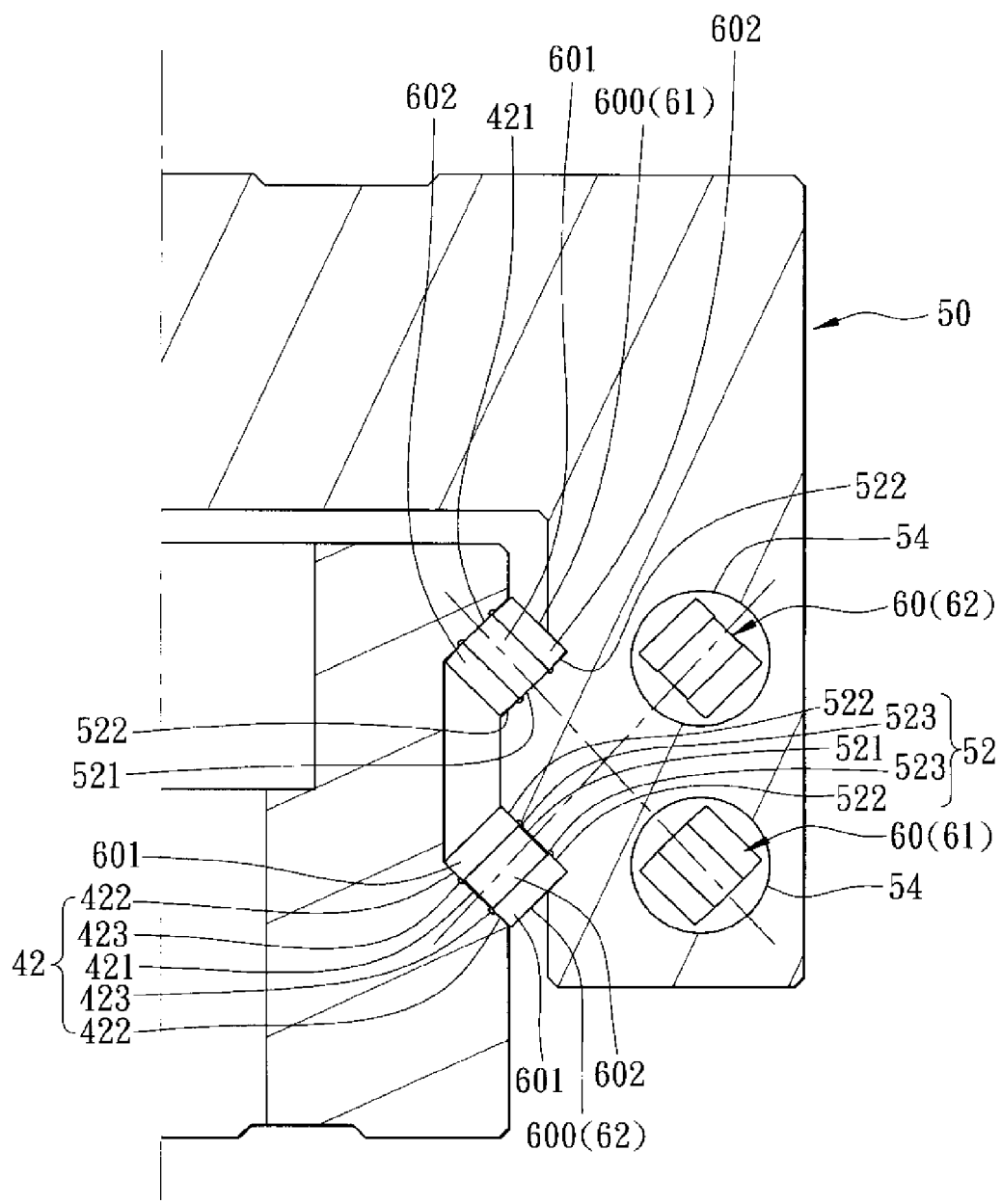
FIG. 5 is a partly sectional view of the preferred embodiment.

Referring to FIG. 5, the second roller-confronting wall surface 52 of each of the lateral parts 51 has third and fourth surface portions 521, 522 respectively confronting the first and second surface portions 421, 422 of the first roller-confronting wall surface 42 on the respective one of the lateral surfaces 41 of the guide rail 40, and further has two second trenches 523. Each second trench 523 extends between the third surface portion 521 and a respective one of the fourth surface portions 522. Accordingly, when burrs are produced from rolling contact between the cylindrical roller train set 60 and each of the guide rail 40 and the slider 50, the first and second trenches 423, 523 may prevent the burrs from affecting rolling of the cylindrical roller train set 60.

Figure 6:
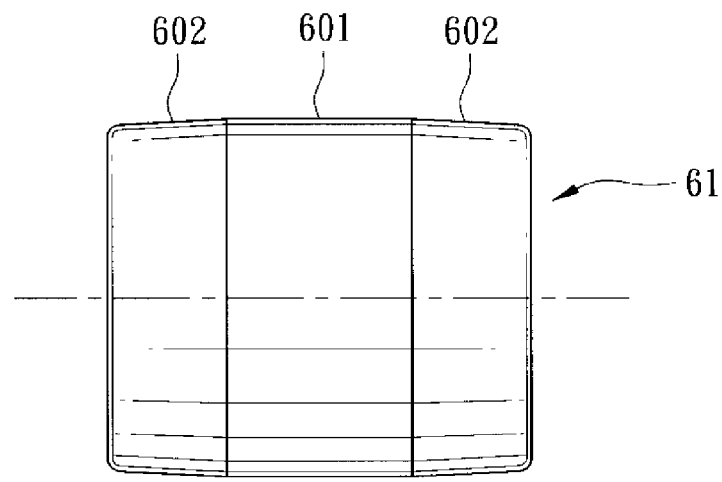
FIG. 6 is a schematic diagram showing the first roller configuration.
Figure 7:
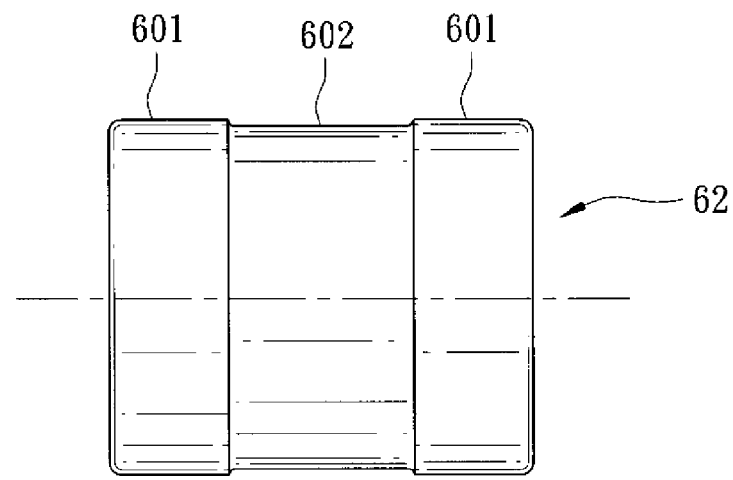
FIG. 7 is a schematic diagram showing the second roller configuration.

Referring to FIGS. 1 to 5, each of the cylindrical roller train sets 60 includes a plurality of cylindrical rollers 600 having first and second roller surface portions 601, 602, each second roller portion 602 being defined to be recessed relative to each first roller surface portion 601. The cylindrical rollers 600 of one of the cylindrical roller train sets 60 have a same one of first and second roller configurations 61, 62. In this embodiment, the cylindrical roller 600 in the first roller configuration 61 has two second roller surface portions 602 and one first roller surface portion 601, and the first roller surface portion 601 is disposed between the two second roller surface portions 602, as shown in FIG. 6. Preferably, the second roller surface portions 602 taper gradually away from the first roller surface portion 601 in the first roller configuration 61. In this embodiment, the cylindrical roller 600 in the second roller configuration 62 has two first roller surface portions 601 and one second roller surface portion 602, and the second roller surface portion 602 is disposed between the two first roller surface portions 601, as shown in FIG. 7. In this embodiment, the cylindrical rollers 600 corresponding to the upper first through-hole 53 have the first roller configuration 61, and the cylindrical rollers 600 corresponding to the lower first through-hole 53 have the second roller configuration 62.

For each cylindrical roller train set 60, the first roller surface portions 601 of the cylindrical rollers 600 are in rolling contact with a respective confronting pair of the first and second roller-confronting wall surfaces 42, 52 at one of confronting pairs of the first and third surface portions 421, 521 and the second and fourth surface portions 422, 522, and the second roller surface portions 602 of the cylindrical rollers 600 are free of contact with the respective confronting pair of the first and second roller-confronting wall surfaces 42, 52.

Figure 8:
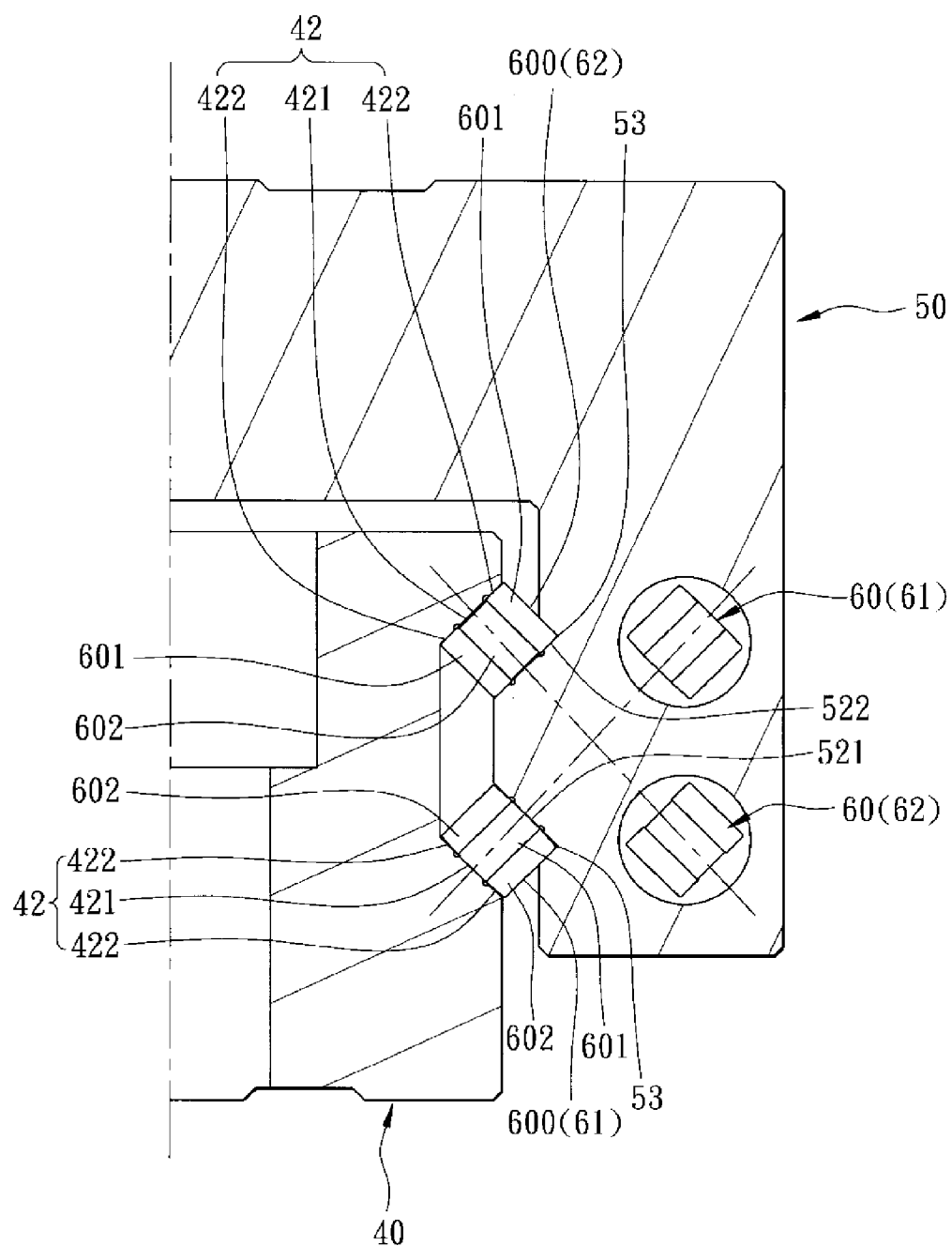
FIG. 8 is a partly sectional view of the preferred embodiment after replacing the cylindrical rollers shown in FIG. 5.

Referring to FIGS. 5 and 8, when the first and third surface portions 421, 521 corresponding to the upper first through-hole 53 are worn out, the cylindrical rollers 600 corresponding to the upper first through-hole 53, which have the first roller configuration 61, may be replaced with the cylindrical rollers 600 having the second roller configuration 602 that are in rolling contact with the undamaged second and fourth surface portions 422, 522 corresponding to the upper first through-hole 53. Similarly, the cylindrical rollers 600 corresponding to the lower first through-hole 53, which have the second roller configuration 62, may be replaced with the cylindrical rollers 600 having first roller configuration 61 that are in rolling contact with the undamaged first and third surface portions 421, 521 corresponding to the lower first through-hole 53.

Figure 9:
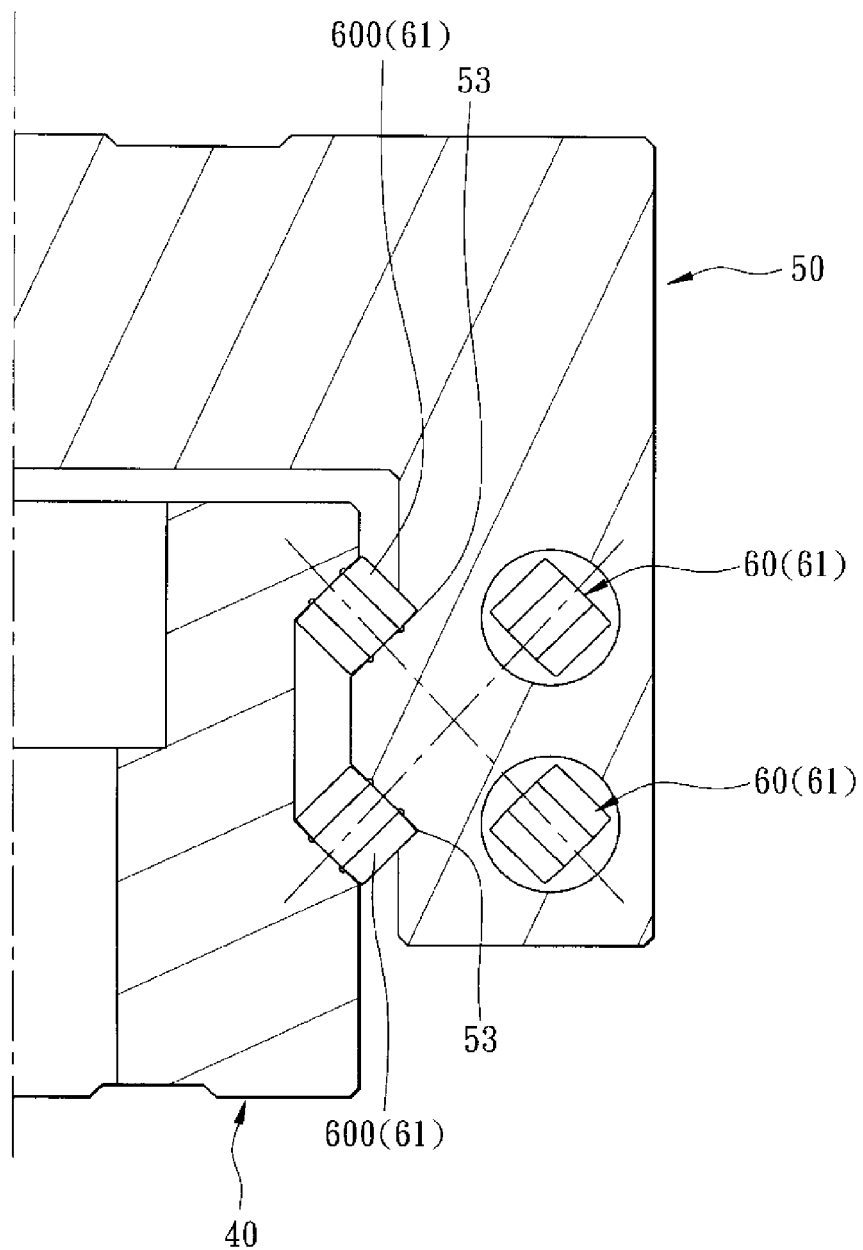
FIG. 9 is a partly sectional view of the preferred embodiment which uses only the cylindrical rollers having the first roller configuration.
Figure 10:
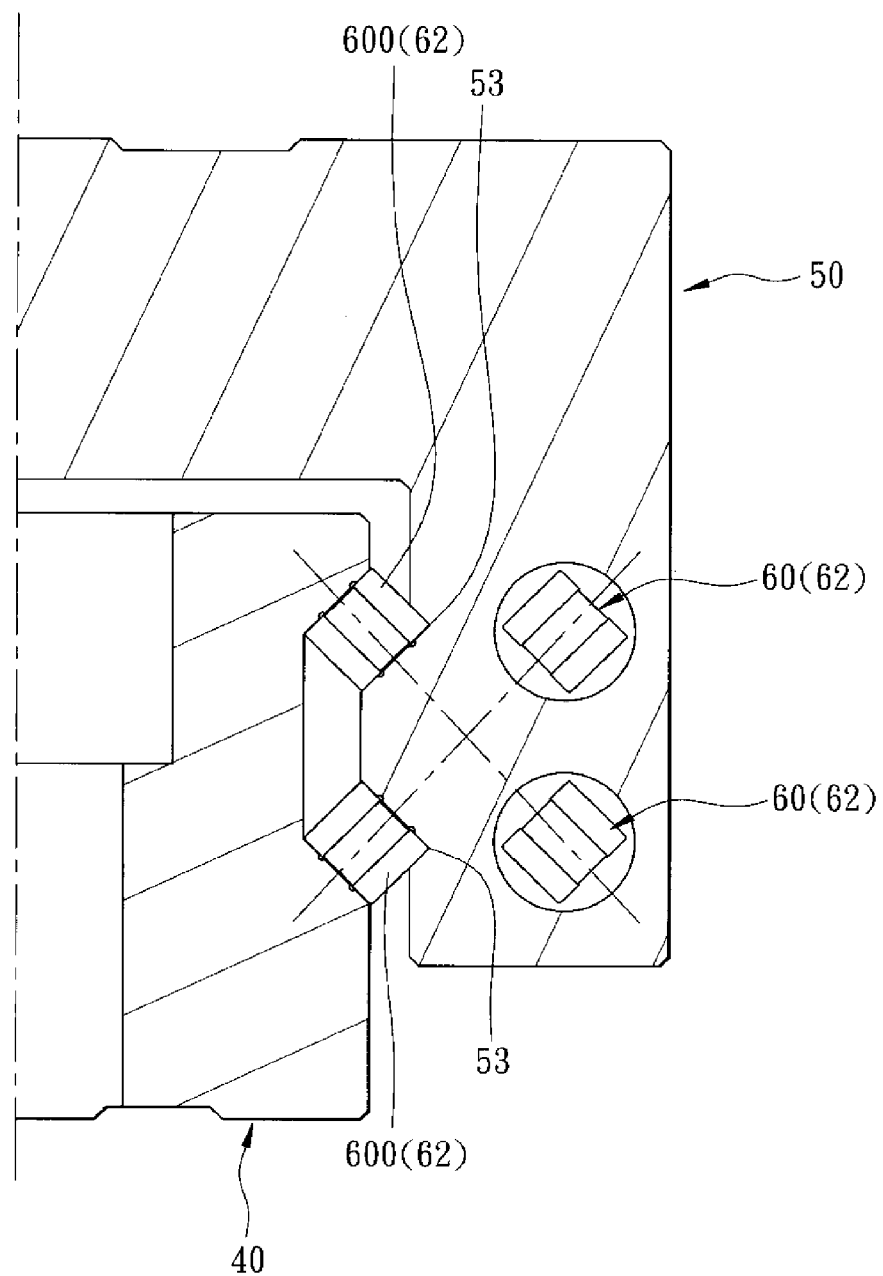
FIG. 10 is a partly sectional view of the preferred embodiment which uses only the cylindrical rollers having the second roller configuration.

It should be noted that, according to this invention, the roller configuration of the cylindrical rollers 600 of each cylindrical roller train set 60 may be chosen to be either the first roller configuration 61 or the second roller configuration 62 at any time, and the cylindrical rollers 600 can be replaced once with the cylindrical rollers 600 having the other roller configuration, so as to prolong the service life of the slide rail device. Referring to FIG. 9, as another example, the cylindrical rollers 600 corresponding to both the upper and lower first through-holes 53 may have the first configuration 61, and the cylindrical rollers 600 can be replaced with cylindrical rollers 600 having the second roller configuration 62, as shown in FIG. 10.

To sum up, the cylindrical rollers 600 of the slide rail device according to this invention have two roller configurations to be alternatively used in each cylindrical roller train set 60, such that when the slide rail device is worn out due to the rolling contact, the cylindrical rollers 600 could be replaced with ones having the other roller configuration, to thereby prolong the service life of the slide rail device and save cost.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A slide rail device comprising:
    a guide rail having opposite lateral surfaces;
    a slider slidable along said guide rail, said slider including opposite lateral parts respectively confronting said lateral surfaces;
        each of said lateral surfaces being formed with a pair of first roller-confronting wall surfaces that are vertically spaced apart from each other;
        each of said lateral parts being formed with a pair of second roller-confronting wall surfaces that respectively confront said first roller-confronting wall surfaces of a respective one of said lateral surfaces and that cooperate therewith to define two rail-slider through-holes;
        each of said lateral parts being further formed with two slider through-holes that correspond respectively to said two rail-slider through-holes thereof;
        each of said first roller-confronting wall surfaces having a first surface portion with opposite edge parts, and two second surface portions respectively extending from said opposite edge parts of said first surface portion;

each of said second roller-confronting wall surfaces having a third surface portion that confronts said first surface portion of the confronting one of said first roller-confronting wall surfaces, and two fourth surface portions that respectively confront said second surface portions of the confronting one of said first roller-confronting wall surfaces; and four cylindrical roller train sets, each of which extends through a respective one of said rail-slider through-holes and one of said slider through-holes that corresponds to the respective one of said rail-slider through-holes;

each of said cylindrical roller train sets including a plurality of cylindrical rollers;

wherein each of said cylindrical rollers of one of said cylindrical roller train sets has a first roller configuration;

wherein, in the first roller configuration, said cylindrical roller has a first roller surface portion and two second roller surface portions that are recessed relative to said first roller surface portion, said first roller surface portion is disposed between said two second roller surface portions and is in rolling contact with a respective confronting pair of said first roller-confronting wall surfaces and said second roller-confronting wall surfaces at said first surface portion and said third surface portion thereof, and said second roller surface portions are free of contact with the respective confronting pair of said first roller-confronting wall surfaces and said second roller-confronting wall surfaces;

wherein each of said cylindrical rollers of another one of said cylindrical roller train sets has a second roller configuration; and wherein, in the second roller configuration, said cylindrical roller has two first roller surface portions and a second roller surface portion that is recessed relative to said first roller surface portions and that is disposed between said two first roller surface portions, said first roller surface portions are in rolling contact with a respective confronting pair of said first roller-confronting wall surfaces and said second roller-confronting wall surfaces at said second surface portions and said fourth surface portions thereof, and said second roller surface portion is free of contact with the respective confronting pair of said first roller-confronting wall surfaces and said second roller-confronting wall surfaces.

2. The slide rail device as claimed in claim 1, wherein each of said first roller-confronting wall surfaces further has two trenches, each extending between said first surface portion and a respective one of said second surface portions, and each of said second roller-confronting wall surfaces further has two trenches, each extending between said third surface portion and a respective one of said fourth surface portions.

3. The slide rail device as claimed in claim 1, wherein said first roller-confronting wall surfaces have identical surface contours, and said second roller-confronting wall surfaces have identical surface contours.

4. The slide rail device as claimed in claim 3, wherein the surface contours of said first roller-confronting wall surfaces and said second roller-confronting wall surfaces are identical.

5. The slide rail device as claimed in claim 1, wherein:
for each of said lateral parts, said cylindrical rollers of said cylindrical roller train set that extends through one of said slider through-holes thereof have the first roller configuration, and said cylindrical rollers of said cylindrical roller train set that extends through the other one of said slider through-holes thereof have the second roller configuration.

6. The slide rail device as claimed in claim 5, wherein:
said slider through-holes of each of said lateral parts include an upper slider through-hole and a lower slider through-hole disposed below said upper slider through-hole;
said cylindrical rollers of said cylindrical roller train sets that extend through said upper slider through-holes of said lateral parts have the same one of the first roller configuration and the second roller configuration, and said cylindrical rollers of said cylindrical roller train sets that extend through said lower slider through-holes of said lateral parts have the same one of the first roller configuration and the second roller configuration.

7. A method of prolonging service life of a slide rail device, the slide rail device including a guide rail, a slider, and a first cylindrical roller train set, the guide rail and the slider having roller-confronting wall surfaces that cooperate to define a rail-slider through-hole, the slider further having a slider through-hole corresponding to the rail-slider through-hole, the first cylindrical roller train set extending through the rail-slider through-hole and the slider through-hole, the method comprising:

when wear of any one of the roller-confronting wall surfaces and the first cylindrical roller train set has occurred, replacing the first cylindrical roller train set with a second cylindrical roller train set;

wherein:
the roller-confronting wall surface of the guide rail has a first surface portion with opposite edge parts, and two second surface portions respectively extending from the opposite edge parts of the first surface portion;
the roller-confronting wall surface of the slider has a third surface portion that confronts the first surface portion, and two fourth surface portions that respectively confront the second surface portions;
each of the first cylindrical roller train set and the second cylindrical roller train set includes a plurality of cylindrical rollers;
each of the cylindrical rollers of one of the first cylindrical roller train set and the second cylindrical roller train set has a first roller configuration;
wherein, in the first roller configuration, the cylindrical roller has a first roller surface portion and two second roller surface portions that are recessed relative to the first roller surface portion, the first roller surface portion is disposed between the two second roller surface portions and is in rolling contact with the first surface portion and the third surface portion, and the second roller surface portions are free of contact with the roller-confronting wall surfaces of the guide rail and the slider;
each of the cylindrical rollers of the other one of the first cylindrical roller train set and the second cylindrical roller train set has a second roller configuration; and
wherein, in the second roller configuration, the cylindrical roller has two first roller surface portions and a second roller surface portion that is recessed relative to the first roller surface portions and that is disposed between the two first roller surface portions, the first roller surface portions are in rolling contact with the second surface portions and the fourth surface portions, and the second roller surface portion is free of contact with the roller-confronting wall surfaces of the guide rail and the slider.

* * * * *